United States Patent [19]

Someya

[11] Patent Number: 5,218,254
[45] Date of Patent: Jun. 8, 1993

[54] MINIATURE MOTORS END CAP BRUSH AND TERMINAL ASSEMBLY

[75] Inventor: Ryouichi Someya, Matsudo, Japan

[73] Assignee: Mabuchi Motor Co., Ltd., Chiba, Japan

[21] Appl. No.: 781,756

[22] Filed: Oct. 23, 1991

[30] Foreign Application Priority Data

Oct. 26, 1990 [JP] Japan .............................. 2-112284[U]
Sep. 20, 1991 [JP] Japan .............................. 3-75853[U]

[51] Int. Cl.$^5$ .......................................... H02K 11/00
[52] U.S. Cl. ................................................ 310/71
[58] Field of Search .................... 310/71, 89, 239, 242; 439/13, 17, 492, 926

[56] References Cited

U.S. PATENT DOCUMENTS

| | | | |
|---|---|---|---|
| 4,056,749 | 11/1977 | Carlson, Jr. et al. | 310/71 X |
| 4,677,333 | 6/1987 | Auzolat et al. | 310/239 |
| 4,845,396 | 7/1989 | Huber | 310/71 X |
| 4,853,576 | 8/1989 | Mayumi et al. | 310/239 |
| 4,934,947 | 6/1990 | Brummans et al. | 439/492 |
| 4,978,876 | 12/1990 | Koster | 310/239 |
| 4,978,877 | 12/1990 | Quirijnen | 310/239 |
| 4,983,872 | 1/1991 | Strobl | 310/239 |

Primary Examiner—Steven L. Stephan
Assistant Examiner—Ed To
Attorney, Agent, or Firm—McGlew and Tuttle

[57] ABSTRACT

A terminal device for miniature motors includes a stator having a field-forming permanent magnet in the inner circumferential surface of a motor case, a rotor having rotor windings wound on a rotor core, and terminals on a case lid made of a synthetic resin. A power-feeding terminal has terminal insertion holes into which insertion-type power-feeding terminals are inserted, and projections are provided which resiliently engage against the terminals and push the terminals. The power-feeding terminals resiliently engage the terminals at locations where the terminals engage against the projections when the power-feeding terminals are inserted along the projections into the terminal insertion holes of the power-feeding terminal.

11 Claims, 8 Drawing Sheets

MINIATURE MOTORS END CAP BRUSH AND TERMINAL ASSEMBLY

FIELD OF THE INVENTION

This invention relates generally to a terminal device for miniature motors, and more particularly to a terminal device for miniature motors having a construction that is easy to assemble and ensures the positive supply of power via power-feeding terminals.

DESCRIPTION OF THE PRIOR ART

Figure 15:
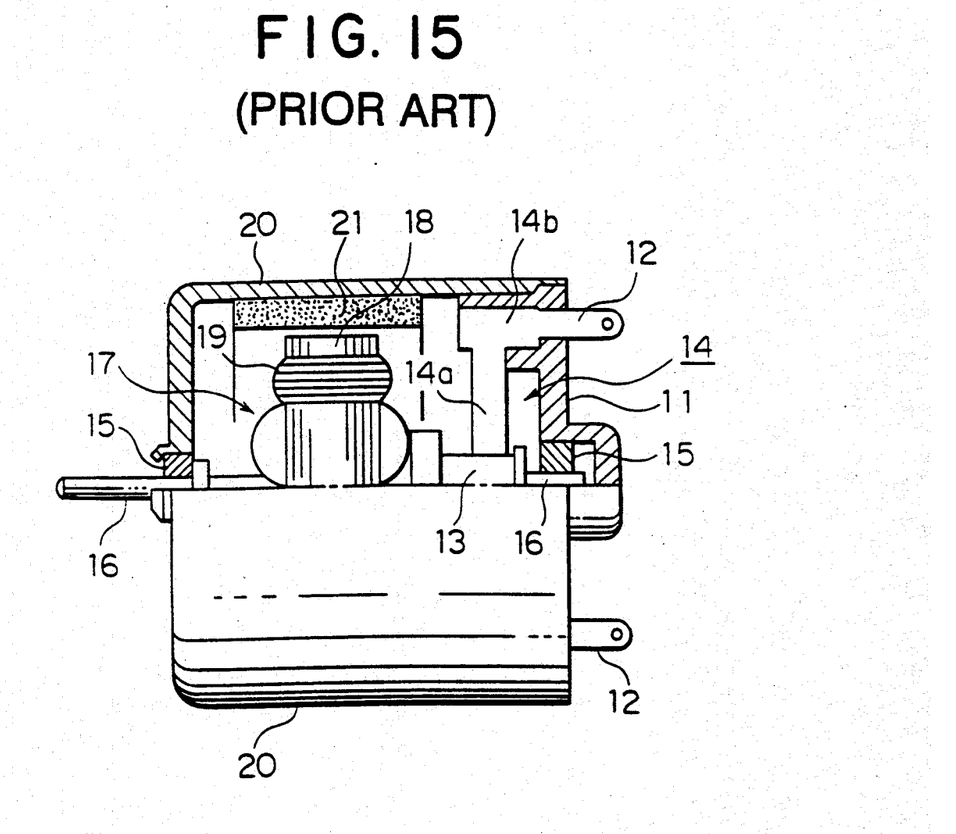
FIG. 15 is a longitudinal sectional view illustrating the construction of a miniature motor of a conventional type.

FIG. 15 shows the construction of a conventional type of miniature motor. In FIG. 15, brushgear 14 making contact with a commutator 13 consists of brush arms 14a and brush bases 14b; the brush bases 14b being supported by a case lid 11 made of a synthetic resin in a state where the brush bases 14b are passed through the case lid 11. A rotor 17 of the miniature motor is placed in a field formed by a permanent magnet 21 fixedly fitted to the inner circumferential surface of a motor case 20. The rotor 17 is caused to rotate as power is fed to rotor windings 19 wound on a rotor core 18 of the rotor 17 fixedly fitted to a motor shaft 16. The rotor shaft 16 is supported by bearings 15 via terminals 12, brushgear 14 and a commutator 13 fixedly fitted to the motor shaft 16. In the conventional type of miniature motor as shown in FIG. 15, power-feeding lead wires are usually connected to the terminals 12 provided in such a manner as to protrude outwards from the case lid 11 by soldering and other connecting means. In recent years, input means allowing power to be fed by means of power-feeding terminals, such as flexible boards, that eliminate the need for soldering are strongly needed for miniature motors used in cameras, for example.

SUMMARY OF THE INVENTION

It is an object of this invention to provide a terminal device for miniature motors having a simple construction and allowing insertion-type power-feeding terminals, such as flexible boards, to be positively connected.

It is another object of this invention to provide a terminal device for miniature motors having a construction in which terminals are not exposed.

It is a further object of this invention to provide a case lid that allows insertion-type power-feeding terminals to be inserted by a predetermined length into terminal insertions holes.

It is still a further object of this invention to provide terminal pushing members of a construction that is held securely by a case lid.

It is still a further object of this invention to provide a cover having a power-feeding terminal connecting means of a construction that is hard to fall from a case lid when the cover is fitted to the case lid.

It is still a further object of this invention to provide insertion-type power-feeding terminals of a shape that can be inserted by a predetermined length into terminal insertion holes.

It is still a further object of this invention to provide a terminal device for miniature motors having a noise-suppressing chip capacitor housed in a case lid and fixedly fitted by a cover. The chip capacitor being connected across terminals.

The terminal device for miniature motors in the disclosed embodiments is concerned with a terminal device for miniature motors comprising a stator having a field-forming permanent magnet in the inner circumferential surface of a motor case, a rotor having rotor windings wound on a rotor core, and terminals on a case lid made of a synthetic resin. A power-feeding terminal connecting means has terminal insertion holes into which insertion-type power-feeding terminals are inserted and projections which resiliently engage the terminals push the terminals. When the power-feeding terminals are inserted along the projections into the terminal insertion holes of the power-feeding terminal connecting means, the power-feeding terminals are resiliently engaged with the terminals at locations where the terminals engage the projections.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF PREFERRED EMBODIMENTS

Figure 1A:
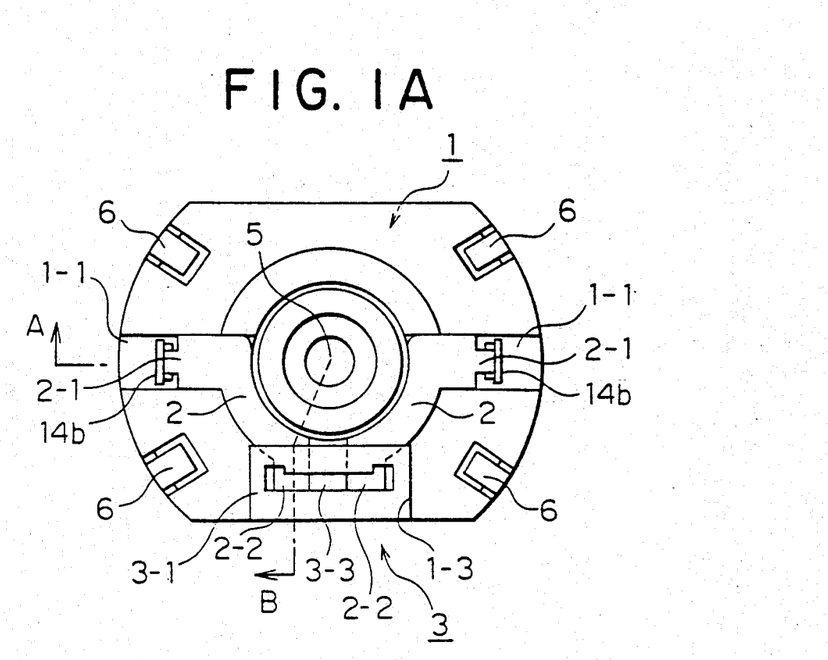
FIGS. 1(A) through (C) are diagrams of a case lid embodying this invention.
Figure 1B:
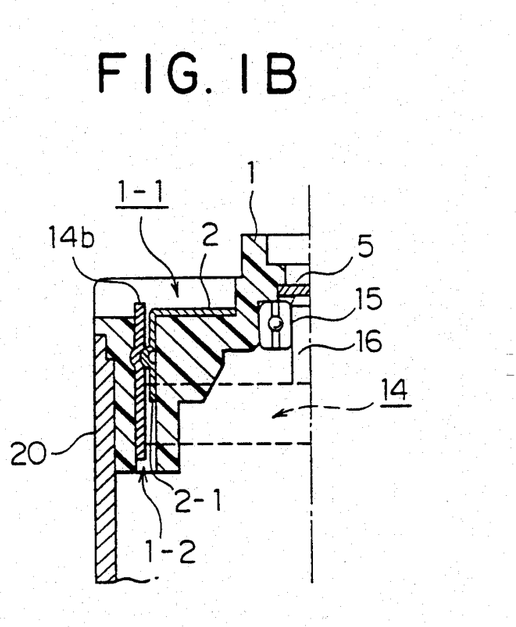
Figure 1C:
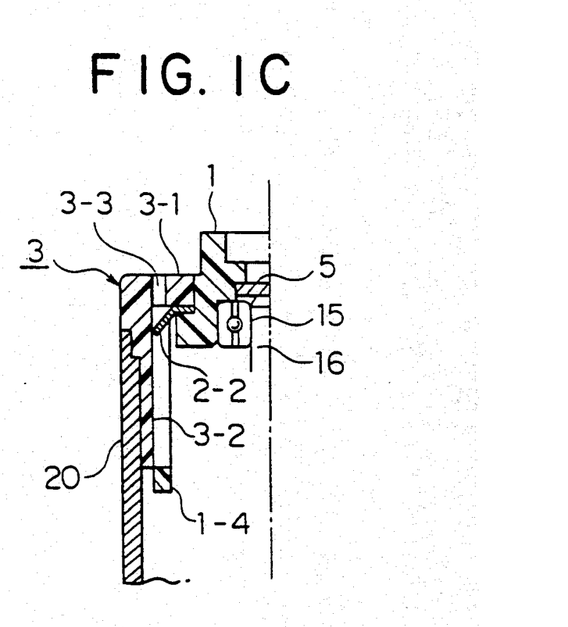

FIG. 1 is a diagram of assistance in explaining an embodiment of this invention. FIG. 1A being a side view of a miniature motor to which this invention is applied and viewed from the side of the case lide thereof. FIG. 1B is sectional view viewed from the direction shown by arrow A in (A), and (C) a cross sectional view viewed from the direction shown by arrow B, in FIG. 1A.

In FIGS. 1(A) through (C), a case lid 1 embodying this invention has a terminal fitting groove 1-1 for fitting a motors terminal 2, a brush holding hole 1-2 into which a terminal press-fit portion 2-1 formed on an end of the terminal 2 and a brush base 14b are inserted to hold brushgear 14, a terminal pushing member housing 1-3 for fitting a terminal pushing member 3, and a flexible board stopper 1-4 (as shown in FIG. 1(C)) with which the tip of the flexible board or power-feeding terminal 4 is engaged when inserting the flexible board 4. The flexible board 4 will be described later with reference to FIG. 3. The terminal 2 of this invention has a terminal press-fit portion 2-1 at one end thereof that is press-fitted into the brush holding hole 1-2 to make contact with a brush base 14b, as shown in FIG. 1(B). A terminal engaging portion 2-2 at the other end of terminal 2 resiliently engages a projection 3-2 of the terminal pushing member 3 in the state where the terminal pushing member 3 is fitted to the case lid 1, as shown in FIG. 1(C).

FIG. 1 shows the state where the case lid 1 is incorporated in the motor case 20, that is, the state where the case lid 1 is press-fitted to an open end of the motor case 20 and fixed with the staking pieces 6. In the following, the process of assembling the case lid 1 will be described.

① First, the shaft supporting plate 5 serving as a thrust bearing for the motor shaft 16, a bearing 15, and the brushgear 14 are fitted to the case lid 1, and the terminal 2 is fitted to the terminal fitting groove 1-1 by press-fitting the terminal press-fit portion 2-1 into the brush holding hole 1-2 while pushing the terminal press-fit portion 2-1 onto the brush base 14b, as shown in FIG. 1(B). In this state where the terminal pushing member 3 has not yet been fitted, the terminal engaging portion 2-2 formed at the other end of the terminal 2 is bent at an angle closer to 180 degrees than that shown in FIG. 1(C) because the terminal engaging portion 2-2 is held in a free state.

② Next, the terminal pushing member 3 is fitted after the case lid 1 has been fitted to the motor case 20 and staked with the staking pieces 6 (staking with the staking pieces may be performed after the terminal pushing member 3 has been fitted). In FIG. 1 showing this state, the commutator, rotor core, rotor windings that are fitted to the motor shaft 16, and the permanent magnet are not shown.

Figure 2:
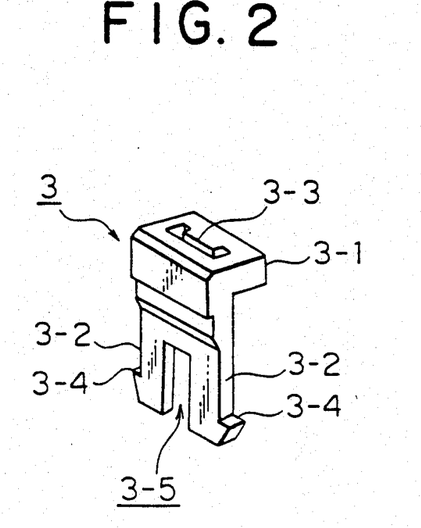
FIG. 2 is a perspective view of an example of a terminal pushing member used in this invention.

Now, the terminal pushing member 3 according to this invention will be described, referring to FIG. 2. The terminal pushing member 3 consists of a base 3-1 and a projection 3-2, both integrally formed. On the base 3-1 there is a flexible board insertion hole 3-3. A retaining stopper 3-4 is provided at the tip of the projection 3-2.

The terminal pushing member housing 1-3 provided on the case lid 1 is formed into a shape that mates with the inside surface and both side surfaces of the base 3-1 and both side surfaces of the projection 3-2 (the details of which are not shown in the figure). With this arrangement, the retaining stopper 3-4 comes in contact with the terminal pushing member housing 1-3 when the terminal pushing member 3 is inserted into the terminal pushing member housing 1-3. To facilitate the insertion of the terminal pushing member 3, a notch 3-5 is provided at the middle of the projection 3-2 so as to allow the projection 3-2 to be compressed.

The state of the terminal engaging portion 2-2 upon completion of the process ② above is shown in FIG. 1(C). That is, the terminal engaging portion 2-2 is resiliently engaged with the projection 3-2 by fitting the terminal pushing member 3 in the process ②, since the tip of the terminal engaging portion 2-2 is pushed by the projection 3-2 of the terminal pushing member 3.

Figure 3:
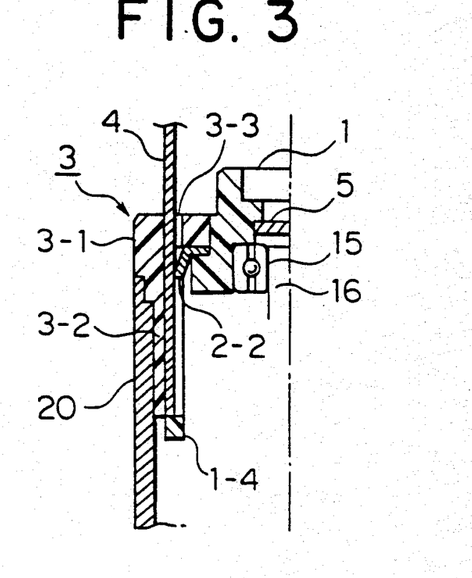
FIG. 3 is a cross sectional view of assistance in explaining the position where a flexible board is fitted.

FIG. 3 shows the state where the flexible board 4 is fitted. That is, after the process ②, as shown in FIG. 1(C), has been completed, the flexible board 4 is inserted into the flexible board insertion hole 3-3. The flexible board 4 is inserted along the projection 3-2 by pushing down the terminal engaging portion 2-2 until the tip thereof reaches the flexible board stopper 1-4. Thus, the terminal engaging portion 2-2 is more resiliently engaged with the flexible board 4, making positive electrical connection between the flexible board 4 and the terminal engaging portion 2-2. The flexible board 4 does not readily fall off once it is fitted.

Figure 4:
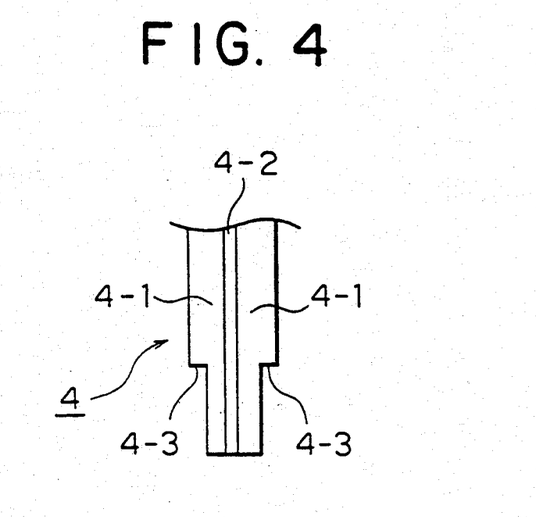
FIG. 4 is a partial front view illustrating an example of the flexible board used in this invention.

In the embodiment of this invention described with reference to FIGS. 1 through 3, the flexible board stopper 1-4 for engaging the tip of the flexible board 4 is provided on the case lid 1. As shown in FIG. 4 which is the front view of the flexible board 4, however, the flexible board stopper 1-4 may be omitted if a shouldered portion 4-3 that makes contact with the upper surface of the base 3-1 of the terminal pushing member 3 is provided on the flexible board 4. Numeral 4-1 in FIG. 4 refers to a power-feeding terminal and 4-2 to an insulated part.

The contact pressure of the terminal engaging portion 2-2 to the flexible board 4 can be set to a predetermined value by appropriately selecting the bending angle and thickness of the terminal engaging portion 2-2.

Figure 5A:
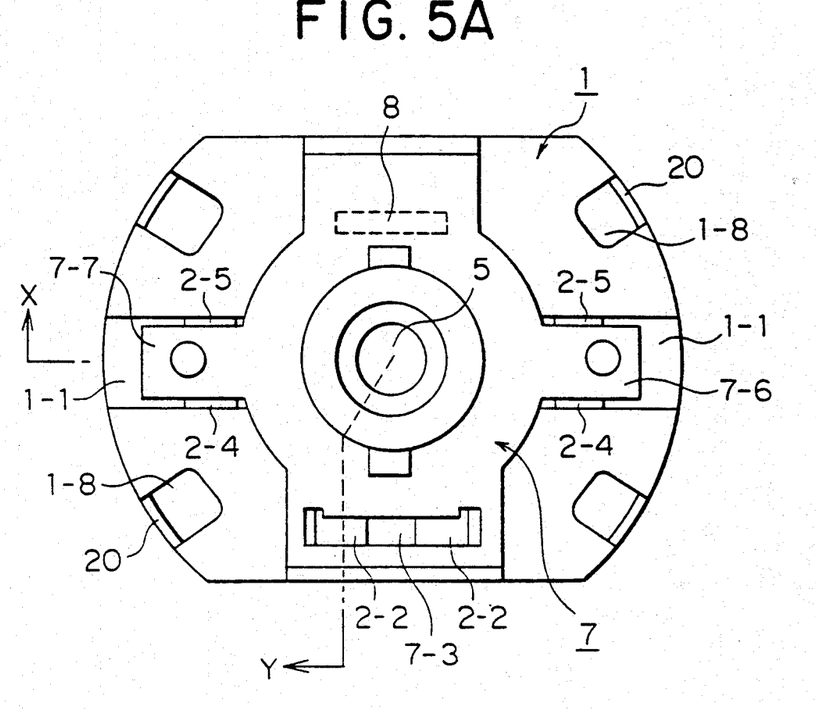
FIGS. 5(A) through (C) are diagrams of assistance in explaining other examples of a case lid of this invention.
Figure 5B:
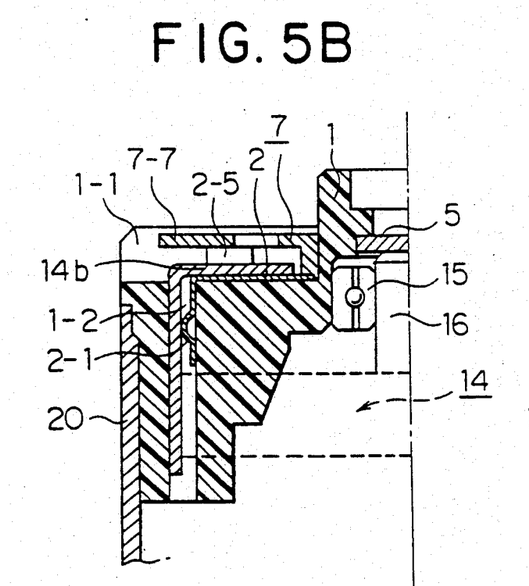
Figure 5C:
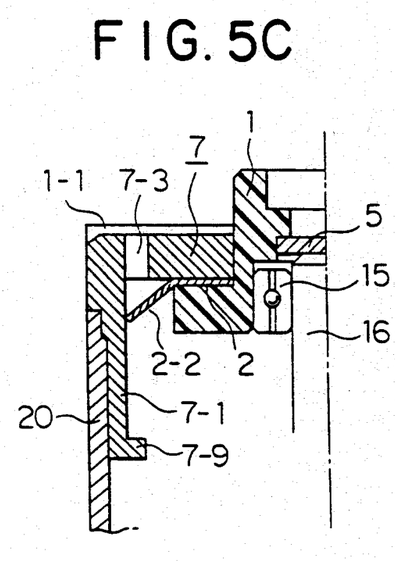

FIG. 5 is a diagram of assistance in explaining another embodiment of this invention FIG. 5A is a side view of a miniature motor to which this invention is applied, and viewed from the side of the case lid 1. FIG. 5B is a cross sectional view, taken along the line shown by arrow X in FIG. 5A and FIG. 5C is a cross sectional view of the same, taken along the line shown by arrow Y in (A).

Figure 7:
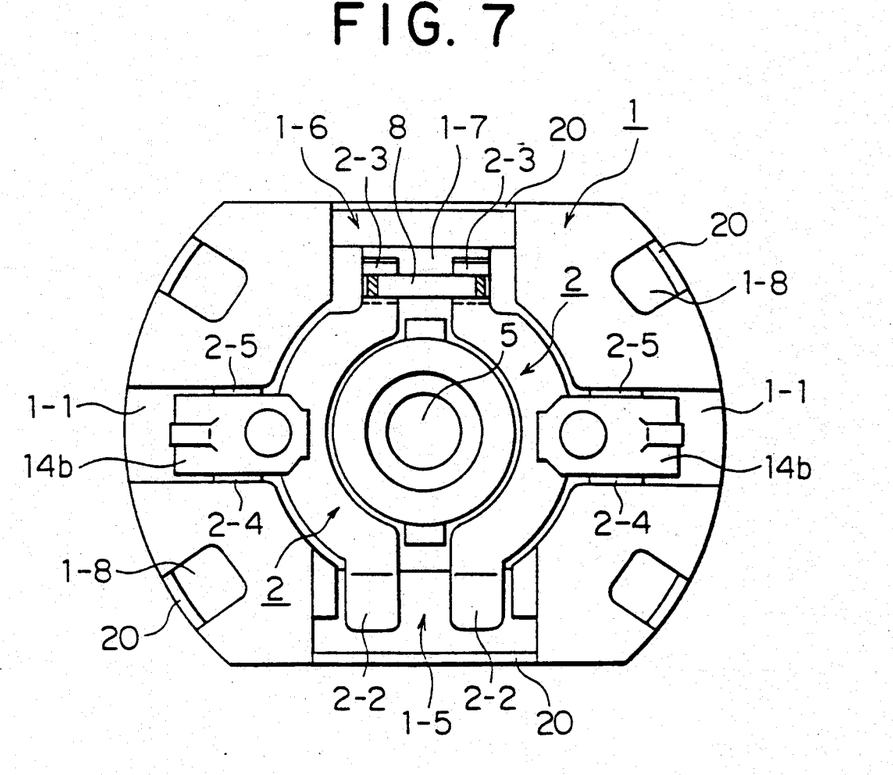
FIG. 7 is a diagram of assistance in explaining the case lid from which a cover is removed.
Figure 9:
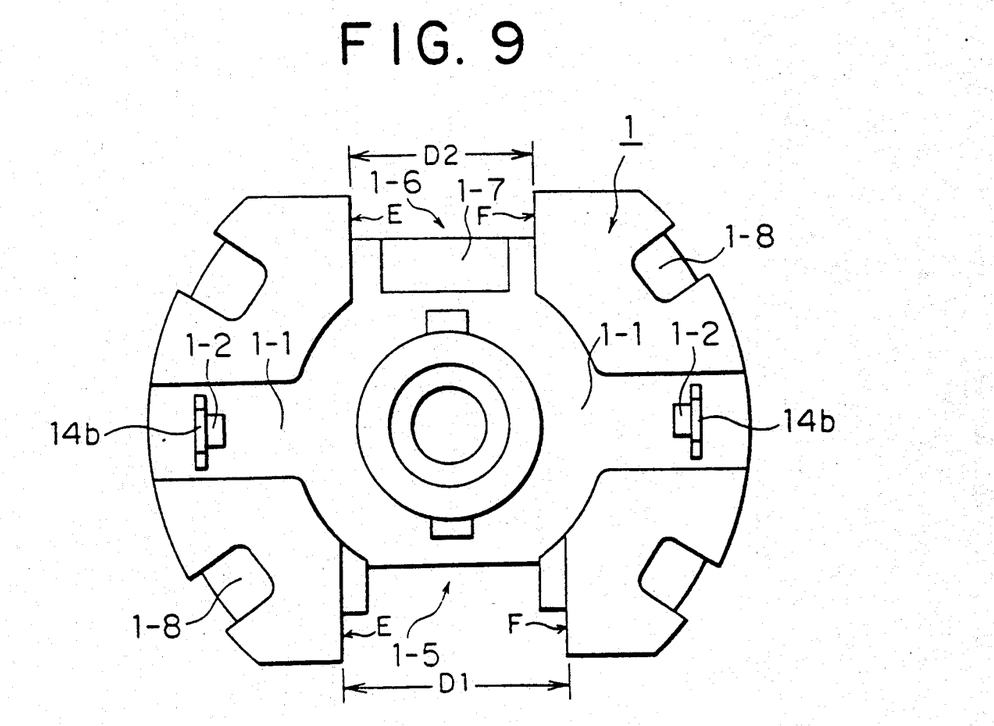
FIG. 9 is a front view of the case lid.
Figure 10:
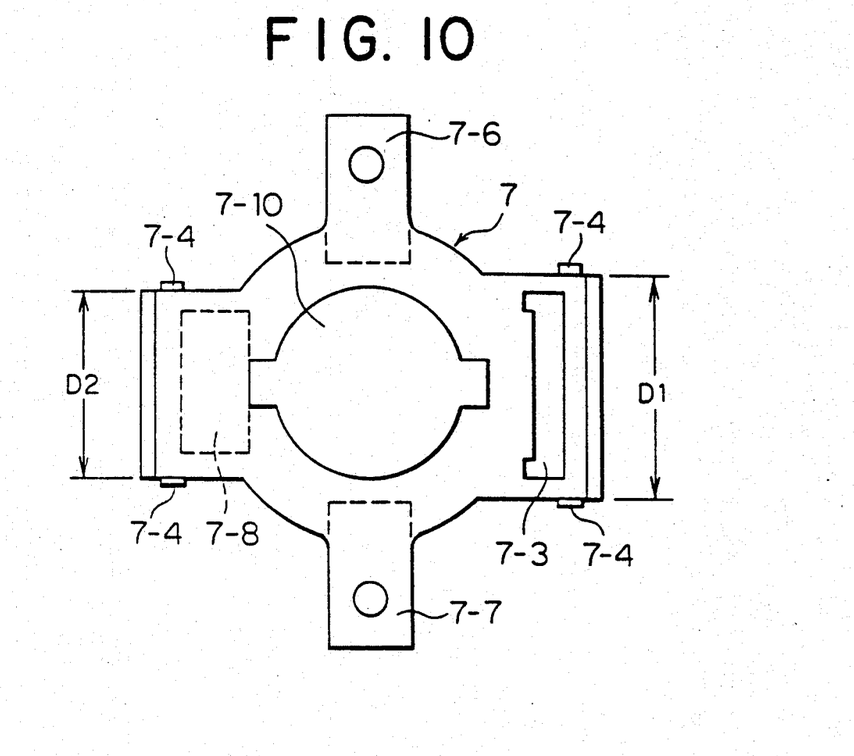
FIG. 10 is a plan view of the cover.
Figure 11:
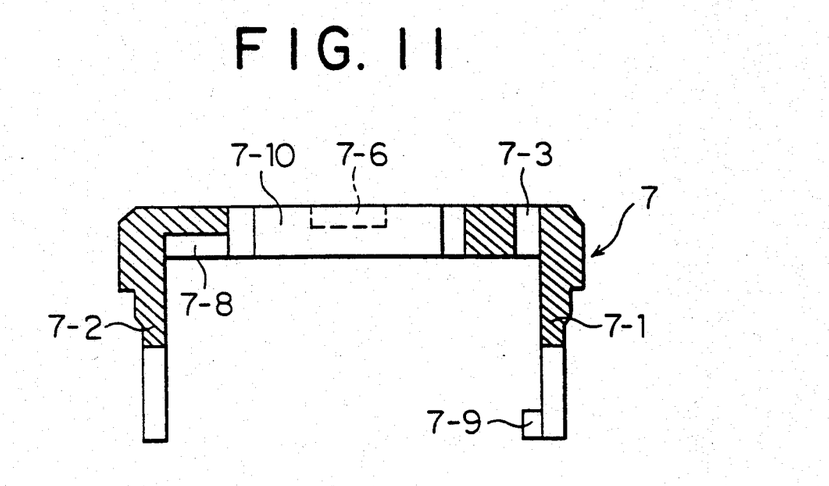
FIG. 11 is a longitudinal sectional view of the cover.
Figure 12:
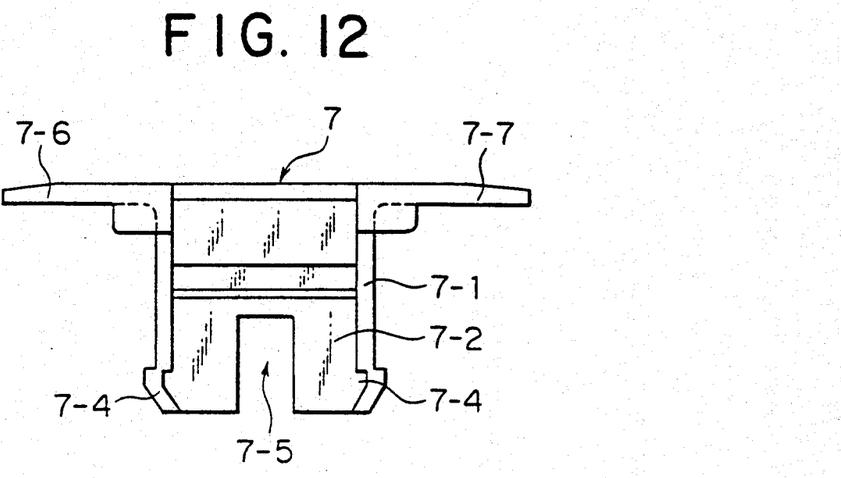
FIG. 12 is a left side view of the cover.
Figure 13:
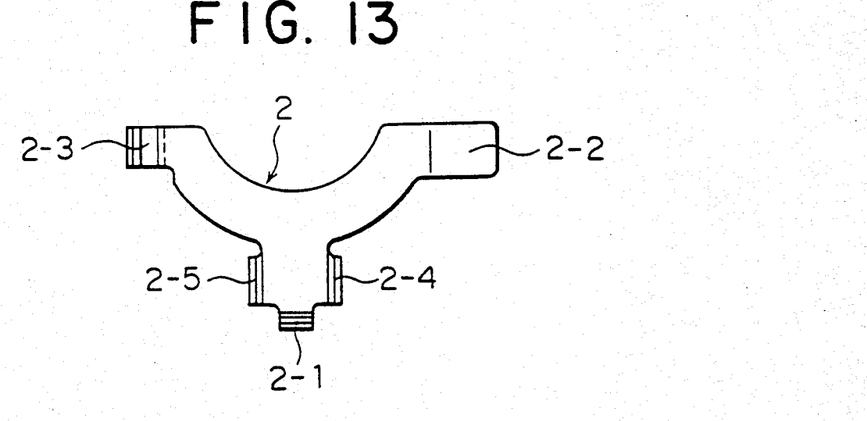
FIG. 13 is a plan view of a terminal.
Figure 14:
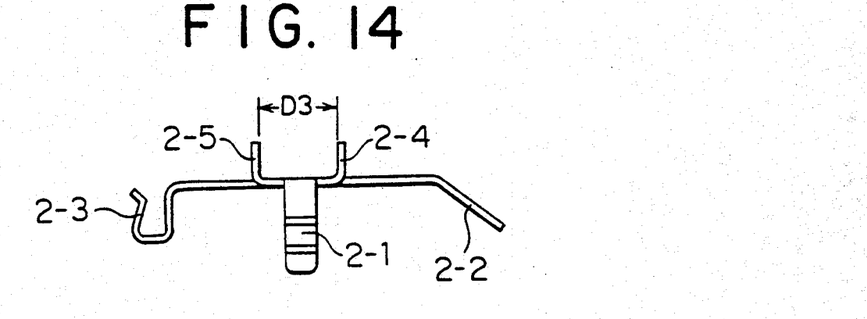
FIG. 14 is a front view of the terminal.

In FIG. 5, and FIG. 7 the case lid 1 has the cover is removed, and the case lid 1 has a shape and construction as shown in FIG. 9. The cover 7 to be fitted to the case lid 1 has a shape and construction as shown in FIGS. 10 through 12 and the terminal 2 has a shape and construction as shown in FIGS. 13 and 14.

The case lid 1 of this invention as shown in FIGS. 5 and 7 has a terminal fitting groove 1-1 for fitting the terminal 2, a brush holding hold 1-2 into which the terminal press-fit portion 2-1 formed on the terminal 2 and the brush base 14b are inserted to hold the brushgear 14. The case lid 1 also has projection engaging portions 1-5 and 1-6 having widths D1 and D2 for fitting the cover 7 to the case lid 1 by engaging with the projections 7-1 and 7-2 of the cover 7, and a housing 1-7 for housing the chip capacitor 8, and an assembling groove 1-8 used to press-fit and assemble the case lid 1 to the motor case 20. The projection engaging portions 1-5 and 1-6 are formed into a shape that mates with both side surfaces each of the projections 7-1 and 7-2, which will be described later. That is, the projection engaging protions 1-5 and 1-6 have wall surfaces E and F.

Figure 8:
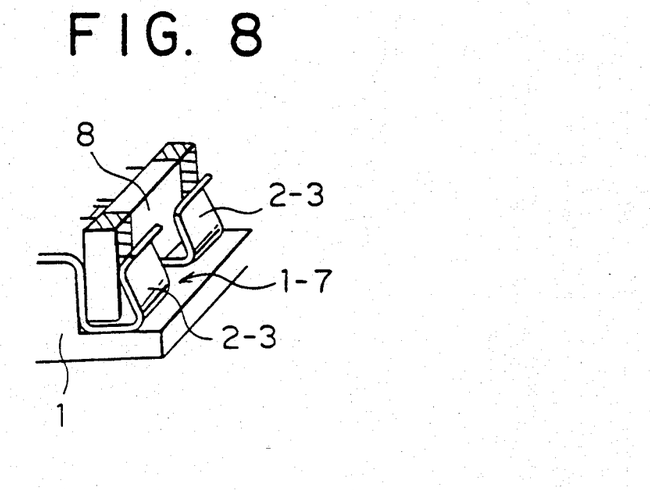
FIG. 8 is a diagram of assistance in explaining the state where a chip capacitor is held in position.

The terminal 2 of this invention used in FIGS. 5 and 7 has at the essentially crescent-shaped middle part thereof a terminal press-fit portion 2-1 that is press-fitted to the brush holding hole 1-2 to make contact with the brush base 14b via guide pieces 2-4 and 2-5 having a width D3, as shown in FIG. 5(B). As shown in FIG. 5(C), the terminal engaging protion 2-2 resiliently engaging with the projection 7-1 of the cover 7 is provided at one end of the essentially crescent-shaped part of the terminal 2, as shown in FIG. 5(C), and a holder 2-3 for holding the terminals of a chip capacitor 8 is provided at the other end thereof, as shown in FIG. 8.

Note that the terminal 2 described above is one of the two symmetrically-shaped terminals fitted to the terminal fitting grooves 1-1.

That is, the terminal 2 shown in FIGS. 13 and 14 and a terminal having a symmetrical shape to the terminal 2 are fitted to each of the terminal fitting grooves 1-1 provided on the case lid 1 shown in FIG. 7.

The cover of this invention used in FIG. 5 is made of a synthetic resin and has at the middle part thereof a hole 7-10. Projections 7-1 and 7-2 face each other, and cover pieces 7-6 and 7-7 are positioned at right angles with respect to the projections 7-1 and 7-2. On the side of the projection 7-1 there is provided a flexible board insertion hole 7-3, and on the rear surface of the projection 7-2 provided is a fixing groove 7-8 for housing and fixedly fitting the chip capacitor 8.

The projection 7-2 has a width D2 to allow the projection 7-2 to be engaged with the projection engaging portion 1-6 provided on the case lid 1. The projection 7-1 has on both the side surface of the tip thereof retaining stopper 7-4, and at the middle part thereof a groove 7-5. The groove 7-5 allows the projection 7-2 to be deflected, with the width D2 being reduced, to facilitate the engaging projection 7-2 to be engaged with the projection engaging portion 1-6, when the projection 7-2 engages with both the wall surfaces of E and F of the projection engaging portion 1-6.

Figure 6:
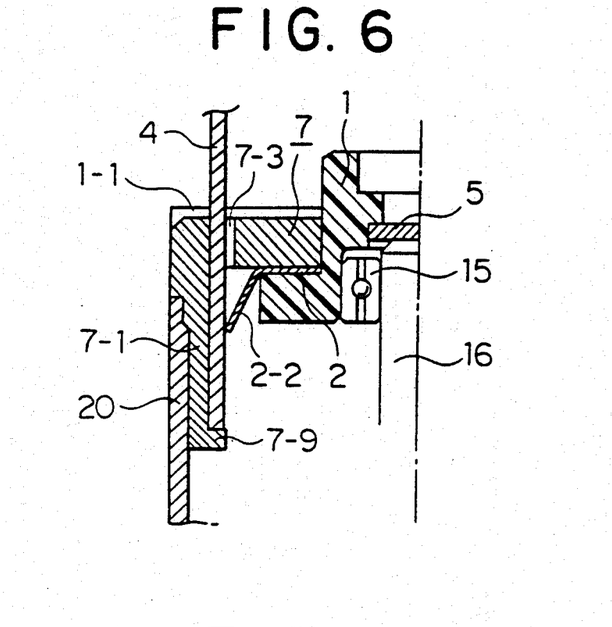
FIG. 6 is a cross sectional view of assistance in explaining the position where the flexible board is fitted.

The projection 7-1 on the opposite side has a width D1, retaining stoppers 7-4 on both the side surfaces of the tip thereof, and a groove 7-5 at the middle part thereof. Inside the tip of the projection 7-1 formed is a flexible board stopper 7-9 that engages with the tip of the flexible board 4 when the flexible board 4, which will be described later, referring to FIG. 6, is inserted into the flexible board insertion hole 7-3.

Next, an example of the assembly process of a miniature motor embodying this invention will be described in the following.

① The shaft supporting plate 5 serving as a thrust bearing for the motor shaft 16, the bearing 15, and the brushgear 14 are first assembled into the case lid 1. In this state, the brush base 14b protrudes outwards from the brush holding hole 1-2 provided at the position of the terminal fitting groove 1-1, as shown in FIG. 9.

② In this state, the terminal press-fit portion 2-1 of the terminal 2 is press-fitted to the brush holding hole 1-2 while pushing the terminal press-fit portion 2-1 onto the protruded brush base 14b, and the other part of the terminal 2 is fitted along the terminal fitting groove 1-1.

③ The brush base 14b protruding outwards from the brush holding hole 1-2 is bent to the terminal 2 side between the guide pieces 2-4 and 2-5 of the terminal 2, and the terminal 2 is mechanically fixed to the case lid 1 while ensuring the electrical connection between the brush base 14b and the terminal 2, as shown in FIGS. 5(B) and 7. Thus, the contact points between both are increased, making electrical connection between both more positive.

Since the terminal engaging portion 2-2 disposed inside the projection engaging portion 1-5 is in a free state, as shown in FIG. 7, the bending angle of the terminal engaging portion 2-2 is kept at an angle closer to 180 degrees, compared with the state where the cover 7 as shown in FIG. 5(C) is fitted. The two holders 2-3 for connecting and supporting the terminals of the chip capacitors 8 are disposed in the housing portion 1-7 provided on the case lid 1.

④ In the type where the chip capacitor 8 is connected to the miniature motor, the chip capacitor 8 is held by the holders 2-3 disposed on the housing portion 1-7, as shown in FIGS. 7 and 8, and then the case lid 1 is press-fitted to the open end of the motor case 20.

⑤ The cover 7 as shown in FIGS. 10 through 12 is placed on the case lid 1, as shown in FIG. 5(A).

That is, when the projections 7-1 and 7-2 provided on the cover 7 are forced along both the wall surfaces E and F of the projection engaging portions 1-5 and 1-6 of the case lid 1, the tips of the projections 7-1 and 7-2 are caused to deflect by the grooves 7-5 provided on the projections, and the projections 7-1 and 7-2 are easily inserted into the projection engaging portions 1-5 and 1-6. As the projections 7-1 and 7-2 are inserted into predetermined locations, the deflected tips of the projections 7-1 and 7-2 are restored to the original state, that is, to the widths D1 and D2. Then, the retaining stopper 7-4 is actuated to fixedly fit the cover 7 to the case lid 1.

At this time, the cover pieces 7-6 and 7-7 are guided between the guide pieces 2-4 and 2-5 and in the terminal fitting groove 1-1, as shown in FIGS. 5(A) and (B) to entirely cover the lead portion of the terminal 2, and the projection 7-1, on the side of which the flexible board insertion hole 7-3, exerts force so as to forcibly bend the tip of the terminal engaging portion 2-2, as shown in FIG. 5(C), and as a result, the terminal engaging portion 2-2 is resiliently engaged with the projection 7-1, while the fixing groove 7-8 provided on the side of the projection 7-2 pushes and fixedly fits the chip capacitor 8.

FIG. 6 shows the state where the flexible board 4 is fitted. That is, the flexible board 4 is inserted into the flexible board insertion hole 7-3 in the state where the cover 7 is fitted to the case lid 1, as shown in FIG. 5(C). The flexible board 4 is inserted all the way along the projection 7-1 in such a manner as to push down the terminal engaging portion 2-2 until the tip of the flexible board reaches the flexible board stopper 7-9. Thus, the terminal engaging portion 2-2 engages more resiliently with the flexible board 4. This makes the electrical connection between the terminal engaging portion 2-2 and the flexible board 4 more positive, keeping the flexible board 4 at a predetermined length and preventing the flexible board 4 from easily falling off or out after being fitted.

In the embodiment described in reference to FIGS. 5 through 14, the flexible board 4 as shown in FIG. 4 may be used. In this case, the flexible board stopper 7-9 provided on the projection 7-1 becomes unnecessary.

In the embodiment described in reference to FIGS. 5 through 14, since the entire lead portion of the terminal 2 is covered with the cover 7, and the terminal engaging portion 2-2 which makes contact with the power-feeding terminal is also within the motor, there are no conductors allowing current to flow in the miniature motor. This makes it possible to use an arrangement where the miniature motor can be in direct contact with other camera components.

Since the embodiment of this invention employs the construction where the brush base 14b is bent to the side of the terminal 2, the number of electrical contacts is increased, making electrical connection more positive, and the terminal 2 can be easily installed on the case lid 1 without using soldering.

In miniature motors connecting the noise-suppressing chip capacitor 8, the chip capacitor 8 can be easily assembled and securely fixed.

The second embodiment as shown in FIGS. 5 through 14 has these features, compared with the first embodiment as shown in FIGS. 1 through 4.

As described above, this invention makes it possible to provide a terminal device for miniature motors of a simple construction, which ensures the positive connection of the flexible board as an insertion-type power-feeding terminal.

Furthermore, workability can be improved because no soldering operation is needed during assembly.

While specific embodiments of the invention have been shown and described in detail to illustrate the application of the principles of the invention, it will be understood that the invention may be embodied otherwise without departing from such principles.

What is claimed is:

1. A terminal device for miniature motors comprising a stator having a field-forming permanent magnet on an inner circumferential surface of a motor case, a rotor having rotor windings wound on a rotor core; current being fed to said rotor winding via a commutator making sliding contact with power-feeding brushgear supported by a case lid made of a synthetic resin; said brush gear consisting of brush bases supported in such a manner as to pass through said case lid, brush arms extending from said brush bases to make contact with said commutator, and motor terminals connected on one end to said brush bases; a power-feeding terminal connecting means has terminal insertion holes into which insertion-type power-feeding terminals are inserted and said power-feeding terminal connecting means also has projections that resiliently engage said motor terminals at an engaging portion; said power-feeding terminal connecting means push said motor terminals at said engaging portion; when said power-feeding terminals are inserted into said terminal insertion holes of said power-feeding terminal connecting means along said projections, said power-feeding terminals are resiliently engaged with said motor terminals at positions where said motor terminals engage said projections; said power-feeding terminal connecting means have formed terminal pushing members made of an insulating material; said terminal pushing members being fitted to a terminal pushing member housing provided on said case lid.

2. A terminal device for miniature motors as set forth in claim 1 wherein stoppers with which the tip of said power-feeding terminals are engaged when said power-feeding terminals are inserted into said terminal insertion holes and are provided on said case lid.

3. A terminal device for miniature motors as set forth in claim 1 wherein said power-feeding terminals have shouldered portions at the tips thereof; said shouldered portions being engaged with circumferential end faces of said terminal insertion holes provided on said terminal pushing members.

4. A terminal device for miniature motors as set forth in claim 1 wherein retaining stoppers and deflecting grooves are formed on projections of said terminal pushing members.

5. A terminal device for miniature motors comprising a stator having a field-forming permanent magnet on an inner circumferential surface of a motor case, and a rotor having rotor windings wound on a rotor core; current being fed to said rotor winding via a commutator making sliding contact with power-feeding brushgear supported by a case lid made of a synthetic resin; said brush gear consisting of brush bases supported in such a manner as to pass through said case lid, brush arms extending from said brush bases to make contact with said commutator, and motor terminals connected to said brush bases at one end; a cover made of a synthetic resin for covering lead portions of said motor terminals; a power-feeding terminal connecting means having terminal insertion holes, into which insertion-type power-feeding terminals are inserted, and said power feeding terminal connecting means also having projections that resiliently engage with an engaging portion of said motor terminals; said power-feeding terminal connecting means pushing said engaging portion of said motor terminals; said power-feeding terminals resiliently engaging with said engaging portion of said motor terminals at locations at which said motor terminals are engaged with said projections when said power-feeding terminals are inserted along said projections and into said terminal insertion holes of said power-feeding terminal connecting means; said terminal insertion holes and said projections of said power-feeding terminal connecting means are formed on said cover; said power-feeding terminals have at the tips thereof shouldered portions for stoppers; said shouldered portions for stoppers being engaged with circumferential end faces of said terminal insertion holes.

6. A terminal device for miniature motors as set forth in claim 5 wherein said projections have stoppers for engaging with the tips of said power-feeding terminals when said power-feeding terminals are inserted into said terminal insertion holes.

7. A terminal device for miniature motors as set forth in claim 5 wherein said cover has two projections for engaging with said case lid; one of said projections serving as said projection of said power-feeding terminal connecting means, and said cover being fixedly fitted to said case lid by means of said two projections.

8. A terminal device for miniature motors as set forth in claim 7 wherein retaining stoppers and deflecting grooves are formed on said two projections.

9. A terminal device for miniature motors as set forth in claim 5 wherein said motor terminals have two guide pieces formed at spacings wider than the width of said brush bases; electrical connection being effected by bending the brush base which are inserted and extended through said case lid, said brush base is bent into a state where said brush base is positioned between said guide pieces of said terminals.

10. A terminal device for miniature motors as set forth in claim wherein said motor terminals have holders for holding and making electrical contact with terminals of a chip capacitor, said case lid has a housing for housing said chip capacitor, and said cover has a fixing groove for housing and fixedly fitting said chip capacitor at a location corresponding to said housing to connect said chip capacitor to said motor terminals.

11. A motor for connecting two projecting power-feeding terminals, the motor comprising:
a stator having a field-forming permanent magnet on an innner circumferential surface of a motor case;
a rotor having rotor winding wound on a rotor core, said rotor including a commutator means for receiving electrical power for said rotor windings;
a case lid attached to said motor case;
brush means attached to said case lids and for making sliding contact with said commutator means;
motor terminals electrically connected to said brush means;
power-feeding terminal connecting means attached to said case lid and for receiving the projecting power-feeding terminals and connecting the projecting power-feeding terminals to said motor terminals, said power-feeding terminal connection means defining terminal insertion holes of a shape into which the projecting power-feeding terminals are insertable, said power-feeding terminal connection means also having projections for inserting into a projection engaging portion of said case lid, said motor terminals having a terminal engaging portion extending into said projection engaging portion of said case lid, said projections of said power-feeding terminal connection means deflecting said terminal engaging portion when said projections are inserted into said projection engaging portion of said case lid, said terminal insertion holes guiding said projecting power-feeding terminals against said terminal engaging portion of said motor terminals and further deflecting said terminal engaging portion.

* * * * *